United States Patent

Andler et al.

[11] Patent Number: 6,103,395
[45] Date of Patent: Aug. 15, 2000

[54] COMPOSITE MULTILAYER BEARING MATERIAL

[75] Inventors: Gerd Andler, Frankfurt; Gerhard Arnold, Heidenrod, both of Germany

[73] Assignee: Glyco-Metall-Werke Glyco B.V. & Co. KG et al, Wiesbaden

[21] Appl. No.: 09/155,299

[22] PCT Filed: Mar. 8, 1997

[86] PCT No.: PCT/DE97/00453

§ 371 Date: Sep. 25, 1998

§ 102(e) Date: Sep. 25, 1998

[87] PCT Pub. No.: WO97/36112

PCT Pub. Date: Oct. 2, 1997

[30] Foreign Application Priority Data

Mar. 27, 1996 [DE] Germany .............. 196 11 929

[51] Int. Cl.[7] .............. B32B 5/14; B32B 15/01; C21D 1/09

[52] U.S. Cl. .............. 428/610; 428/684; 428/644; 428/648; 428/647; 354/912; 354/625; 148/525; 219/121.65; 219/121.66

[58] Field of Search ............... 428/610, 684, 428/644, 648, 677; 354/912, 625; 148/525; 219/121.65, 121.66

[56] References Cited

U.S. PATENT DOCUMENTS

| | | |
|---|---|---|
| 4,299,860 | 11/1981 | Schaefer et al. . |
| 4,474,861 | 10/1984 | Ecer . |
| 5,132,083 | 7/1992 | Takeda et al. . |
| 5,468,308 | 11/1995 | Braza et al. . |

FOREIGN PATENT DOCUMENTS

| | | |
|---|---|---|
| 36 36 641 | 5/1987 | Germany . |
| 36 35 751 | 10/1991 | Germany . |
| 89 10 434 | 11/1989 | WIPO . |
| 91 14 799 | 10/1991 | WIPO . |

*Primary Examiner*—Deborah Jones
*Assistant Examiner*—Jason Savage
*Attorney, Agent, or Firm*—Reising, Ethington, Barnes, Kisselle, Learman & McCulloch, P.C.

[57] ABSTRACT

A laminated composite material, and a method of improving the surface hardness of laminated composite materials, wherein selected regions of the carrier material of the laminated composite system are treated with high-energy beams, and the temperature control is designed in such a manner that the rays penetrate into a maximum a 0.1-fold the entire thickness of the carrier material. The temperature increase in the region of the sliding material is a maximum of 80% of the melting temperature of the lowest melting constituent of said material. The laminated composite material with a rear steel substrate surface can be post-hardened. The steel substrate has at least in one part of the surface facing away from the function layer a level of hardness increased by a factor of 1.5 or more than at a depth which corresponds substantially to 0.1-fold of the thickness of the steel substrate.

37 Claims, 3 Drawing Sheets

COMPOSITE MULTILAYER BEARING MATERIAL

BACKGROUND OF THE INVENTION

1. Field of the Invention

The invention relates to a composite multilayer material, as well as to a method of modifying composite multilayer material systems, especially for improving the surface hardness of such systems.

2. Description of Related Art

The use of composite multilayer materials consisting of steel with an overlay of plain bearing materials (e.g. Al- or Cu-based materials with soft phases such as, for example, tin, lead and/or bismuth) for tribological applications has been known for many years. Conventional methods such as cladding by rolling, cladding by casting, sintering or electroplating have proved the best methods of producing such composite systems, but new processes such as sputtering, vapour deposition or plasma coating also constitute prior art.

All these methods of producing such composite multilayer materials are distinguished by the fact that, after coating of the steel backing material with a sliding material, either metal working or surface machining processes are carried out. This is usual in the case of cladding by rolling, cladding by casting, sintering and plasma coating. Often, forming processes are also carried out prior to application of the final overlay, as is the case with electroplating, sputtering and vapour deposition. In none of these manufacturing processes for producing such composite multilayer materials are modifications carried out on the steel backing material of the final, finished component with the aim of optimising the former's tribological properties, such that corresponding disadvantages arise in certain instances of use with respect to the operability or service life of the component. Two examples of this situation are cited below.

The connecting rod bearings used in modern engine construction consist of composite multilayer systems such as the structure comprising steel, bearing metal and optionally a third layer applied by electroplating or other surface coating methods. In virtually all cases, the starting material is coated strip material, to which the subsequent functional layer is applied by means of cladding by rolling, cladding by casting or sintering. After coating, the semi-finished product undergoes a plurality of rolling and/or annealing processes until, through metal-working processes such as pressing or rolling, the bearing shell assumes its final shape.

For this production method it is most common to use unalloyed, low-carbon, low-strength steels. The reasons for this are, on the one hand, that bearing pressing processes are technically difficult to control when substrates are used which comprise high-strength steels and, on the other hand, that in the case of low price products of this type the role of cost considerations, i.e. doing without the more expensive steels, is an ever more one. It is not possible, either, to fall back on work-hardened or surface-hardened backing materials in the production of such components, since it is impossible to maintain their relatively high initial hardness right through the individual manufacturing steps (e.g. annealing of the semi-finished product) to the finished bearing.

However, owing to the ever increasing specific loading of such components through minimisation of component size (weight reduction and thus lower fuel consumption) and/or the construction of ever more powerful engines, not only is it the case that very high demands are made of the bearing metal layer itself but also the steel backing is exposed to ever greater stresses. For example, in the case of steels exhibiting low wear resistance, such as are used today, any slight relative movements which may occur between bearing backing and connecting rod as-a result of high loading or speeds will lead to wear phenomena in the form of ridge formation or raised zones on the bearing backing. The consequences are a reduction in the ratio of bearing contact area to total area and thus in heat dissipation and the encouragement of oil carbon formation. These effects may lead, either individually or in combination, to defective functioning or even to complete failure of the bearing.

Another example would be so-called plate cams or disk cams, as are used in radial or axial piston machines for hydraulic pumps and motors. Conventional plate cams consist of composite materials, i.e. a steel backing with a functional layer of typical bearing metals such as for example CuPbSn alloys generally applied by means of cladding by casting. If, under heavy loads, relative movements occur in such components between the steel backing of the disk cam constructed as a composite multilayer material and the opposing machine component, cold welding may arise between the plate cam and its counterpart, which leads to impairment of the operation of the tribosystem or even to complete failure thereof.

DE-PS 688246 describes a method of hardening bearing shells made of iron alloys, wherein the overlay of the bearing shell is treated with a gas torch and the mould holding the bearing shell is simultaneously cooled. This method only affects the overlay.

DE-OS 2209148 relates to a method of energy radiation remelt treatment, with which refinement of material surfaces is carried out. The surface of narrowly defined, mutually unconnected surface elements is melted and then cooled in order to change the structure. In each individual instance, the choice of appropriate moulds and arrangements of the surface elements to be remelted of a workpiece or component depends on the respective applications and the stresses, wear problems and the like arising therefrom. However, no details are given as to the treatment of composite multilayer materials or, more particularly, of composite multilayer materials made up of low-melting-point metals, as used in sliding elements.

EP 01 30 175 A2 describes a plain bearing comprising a backing shell and a bearing metal layer applied to the steel shell, said bearing metal layer forming overlay zones distributed over the width of the overlay and extending at least substantially in the running direction, between which zones there are provided zones of a different hardness from that of the bearing metal layer. In order reliably to prevent the problems which may arise between the bearing materials of different hardnesses, heat treatment is carried out. Alloy materials are thus melted by means of laser and electron beams in the area of the zones extending in the running direction.

EP 01 30 176 relates to the use of laser and electron beams to improve plain bearings, but once again only the bearing metal layer is treated.

SUMMARY OF THE INVENTION

In view of the prior art cited and discussed above, it is therefore the object of the invention to provide a composite multilayer material of the above-mentioned type which exhibits improved mechanical/technological properties, especially improved surface hardness of the steel backing. From the point of view of method, the problem on which the invention is based is that of modifying a composite multi-layer material for use as a sliding element and consisting of a steel backing member and bearing metal functional layer in such a way that the disadvantages relating to the mechanical/technological properties of the overall system and described above with reference to two examples may be economically and effectively countered without other properties of the component being negatively affected.

By providing the steel substrate, in the case of a composite multilayer material with a substrate layer of steel and at least one functional layer of bearing metal applied thereto, wherein the substrate is an unalloyed or low-alloy steel with a C content <0.35% (wt/wt) and comprises a surface remote from the functional layer(s), with a hardness greater by the factor 1.5 or more at least in parts of the remote surface than at a depth corresponding to approximately 0.1 times the thickness of the steel substrate, wherein the hardness is measured as Vickers hardness HV 0.01 and the depth or thickness, starting at the remote surface with increased hardness, is determined orthogonally in the direction of the functional layer(s), it is possible, in a not immediately foreseeable manner, to improve the wear resistance of the backing material without any detrimental effect on the properties of the functional layers. By treating in particular selected areas of the backing material (e.g. the steel backing of bearing shells, the rear of disk cams, the areas of bores in the case of thrust washers etc.) of the composite multilayer system with high-energy beams, wherein temperature control is such that the beams penetrate to at most 0.1 times the overall thickness of the backing material and the increase in temperature in the area of the sliding material amounts to at most 80% of the melting temperature of the lowest-melting-point component of this material, the rear of the steel substrate is subsequently hardened.

In an advantageous embodiment, the thickness of the steel substrate layer ranges from 0.2 to 20 mm. The thickness of the substrate ranges particularly preferably from approximately 0.5 to 15 mm.

The steel substrate layer of a composite multilayer member according to the invention is of unalloyed or low-alloy steel.

If it is of unalloyed steel, it is preferable for said steel to have a C content ranging from 0.03 to 0.06% (wt/wt).

If it is of low-alloy steel, the latter advantageously comprises a carbon content of up to 0.35%, a manganese content of up to 0.8%, a phosphorous content of up to 0.035%, a sulphur content of up to 0.03%, an aluminium content of up to 0.1%, a silicon content of up to 0.12%, a chromium content of up to 1.5% and a nickel content of up to 3%, the sum of the alloy elements (apart from carbon) being <5% and all percentages being percentages by weight (wt/wt).

The invention also relates to a method of improving the surface hardness of composite multilayer materials, especially sliding elements, which comprise a substrate layer of unalloyed or low-alloy steel and at least one functional layer of bearing metal applied thereto, the substrate layer comprising a surface remote from the functional layer(s), by irradiation with high-energy beams, such as laser or electron beams, which are moved relative to a surface to be irradiated, characterised in that the remote surface is irradiated at least in selected areas, the radiation being such that it penetrates to a depth of at most 1/10 of the thickness of the substrate layer in the respective area and in that the increase in the temperature of the functional layer caused by the radiation reaches only at most approximately 80% of the melting temperatures of the lowest-melting-point component of this functional layer.

The procedures used according to the invention offer the advantage that the heat treatment may be carried out on the finished part, whereby the normal manufacturing cycle of the sliding elements may be retained in all its component steps. Since it is not a remelt process, no mechanical reworking (e.g. grinding, turning) of the modified areas is necessary. Moreover, the method is environmentally friendly. Other methods of improving the wear resistance of the backing material, such as coating processes for example, are ruled out either for reasons of cost (reworking required) or temperature (diffusion processes such as carburising, nitriding).

Because the structural modification of the backing material only reaches a maximum depth of 0.1 times the thickness of the backing material, it is even possible to treat thin workpieces which are prone to warping. The overlay material remains unaffected by this heat treatment.

If the overlay material comprises low-melting-point components such as tin, lead and/or bismuth, it is especially important for temperature loading not to be too great. This is the case especially when the functional layer adjacent the modified backing layer consists of an aluminium-tin alloy (for example AlSn20Cu) or lead-bronze (for example CuPb22SN). Bearing alloys such as aluminium bronze (for example CuAl8) or copper-zinc alloy (for example CuZn31Si) or tin-bronze (for example CuSn8) must also not be exposed to too high a level of temperature loading, if the structure which has been optimised with respect to sliding properties is not to be damaged.

The energy introduced per unit area is preferably 200–300 watt-seconds per $cm^2$, especially 250 watt-seconds per $cm^2$, the residence time of the high-energy beam on the surface to be treated of the backing material being 0.8 to 1.2 sec, preferably 1 sec. The energy input is such that the temperature of the surface to be treated lies below the melting temperature of the backing material.

The energy input is controlled by the power of the electron or laser gun and/or by the feed rate of the beam, wherein here also the requirements relating to penetrative effect and temperature increase have to be fulfilled.

To ensure heat treatment of the whole surface, the high-energy beam is conveyed over the surface to be treated along predetermined paths, the spacing of the paths being smaller than the focal diameter of the beam. It is possible either for the sliding element to be moved beneath the beam or the beam to be guided over the sliding element. The high-energy beam may also preferably be guided gridwise over the surface to be treated.

Cooling is preferably obtained by the self-quenching effect, i.e. by the dissipation of heat into the interior of the component, but may also be achieved using liquid nitrogen, by immersing the component completely in liquid nitrogen directly after treatment with high-energy beams, such that a quenching effect is brought about.

The heat treatment may be controlled by varying the energy input and/or the feed of the high-energy radiation to the surface to be treated, in such a way that, during a treatment programme, areas subject to higher tribological stress are more intensively hardened than areas subject to low tribological stress. It is also possible to treat only selected areas of the sliding element with high-energy radiation and to bring about an increase in hardness only in those areas.

Heat treatment is preferably carried out on a backing material of unalloyed and/or low-alloy steel. In the case of the heat treatment of unalloyed steel, said steel preferably comprises a carbon content of at most 0.1%, preferably from 0.03 to 0.06%. Tests carried out on steel/bearing metal composites have surprisingly shown that, in the case of steels with such carbon contents (without other alloy elements worth mentioning) marked hardening of the steel surface may be effected by means of an electron beam. It proved possible to increase said hardness by 150–180%.

When low-alloy steels are used, the latter preferably comprise the following composition: carbon content up to 0.35%, manganese content up to 0.8%, phosphorous content up to 0.035%, sulphur content up to 0.03%, aluminium content up to 0.1%, silicon content up to 0.12%, chromium content up to 1.5% and nickel content up to 3%.

Owing to the versatility of the treatment process, achieved in particular through the precise controllability of the energy radiation used with respect to its local effectiveness and/or the desired depth of hardness, the field of application is not restricted only to composite materials, such as plain bearings for example. Instead, other tribologically stressed engine components (thrust washers, bushes) or sliding elements in general may undergo optimisation of the backing material.

BRIEF DESCRIPTION OF THE DRAWINGS

Exemplary embodiments of the invention are described in more detail below with the aid of the drawings, in which.

BRIEF DESCRIPTION OF THE PREFERRED EMBODIMENTS

Figure 1:
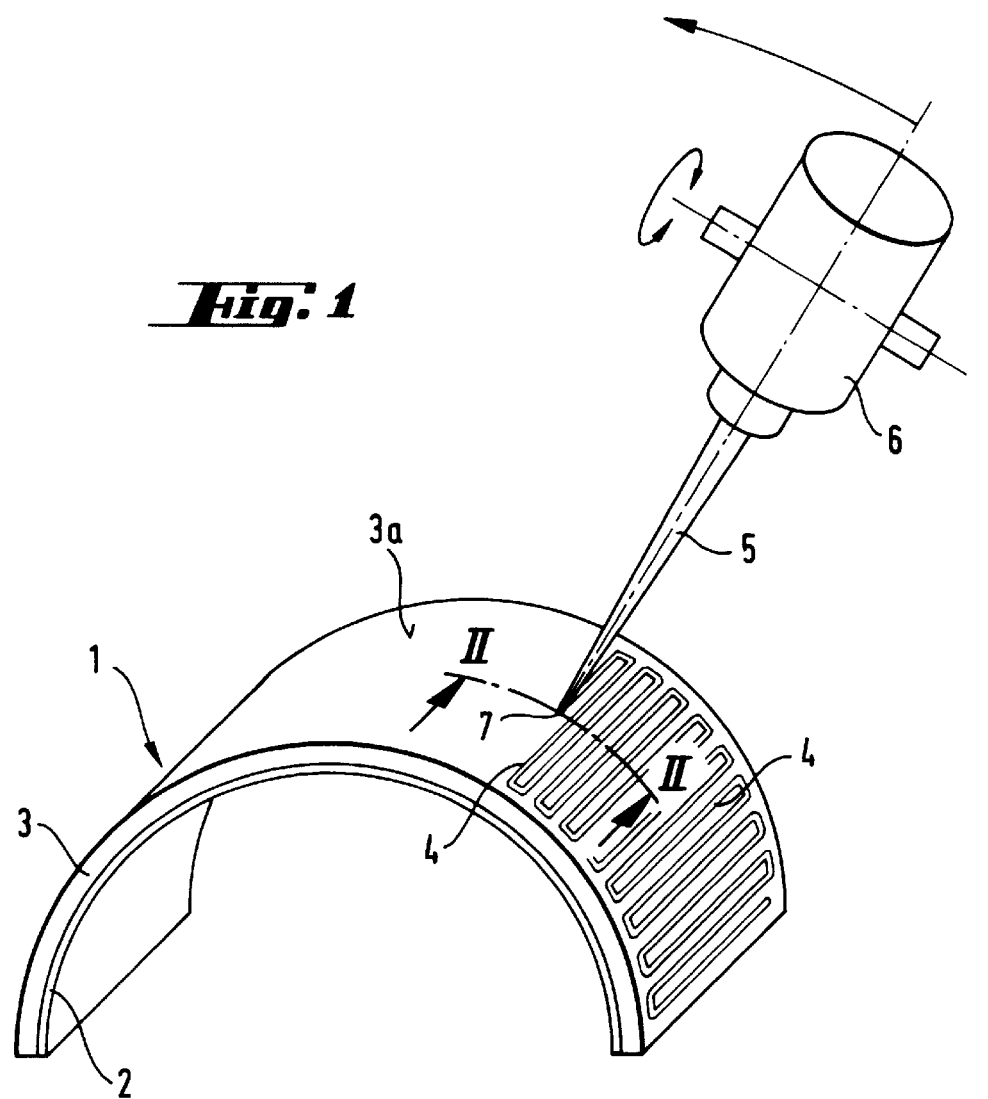
FIG. 1 shows a perspective representation of a plain bearing shell, the rear of which undergoing heat treatment by means of a high-energy beam.
Figure 2:
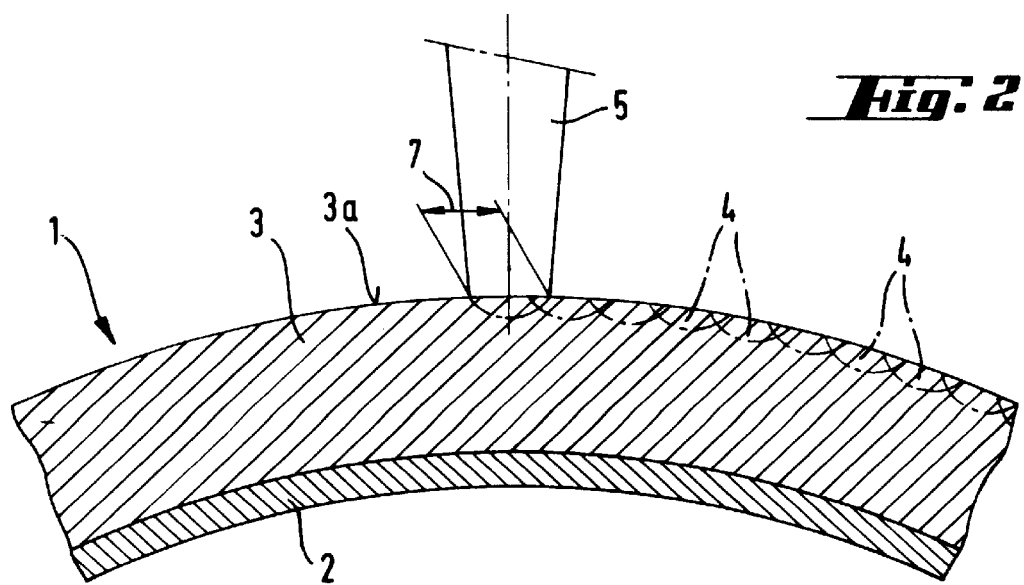
FIG. 2 shows a section along line II—II through the plain bearing shell shown in FIG. 1.

FIG. 1 shows a plain bearing shell 1 comprising a backing material 3 of unalloyed steel, coated on its inside with a bearing material 2. The rear of the backing material 3 is being heat-treated by means of an electron beam 5, which is generated in an electron gun 6. In the embodiment shown here, the bearing shell 1 is stationary and the high-energy beam 5 is guided along the paths 4 over the rear of the backing material 3. In FIG. 1, the spacing of the paths 4 is selected for reasons of clarity. In actual fact, the paths are so close together that they overlap, as shown in FIG. 2. Since the path width is defined by the focal area 7, the spacing of the paths 4 is selected to be smaller than the focal diameter. It may clearly be seen that the heat treatment extends over only part of the backing material 3, such that the bearing material 2 remains unaffected by this heat treatment.

Figure 3:
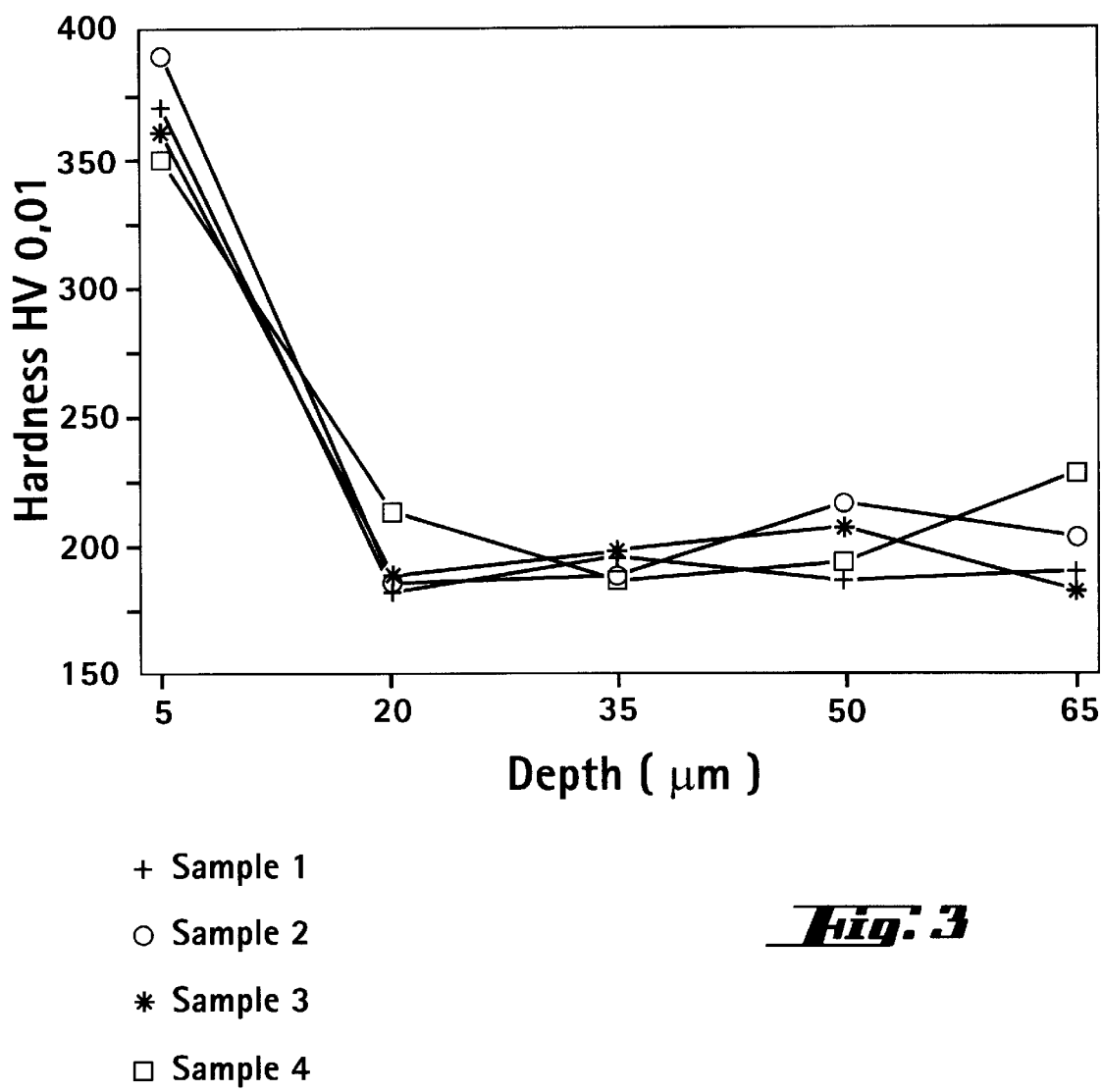
FIG. 3 shows a diagram illustrating the hardness profile of a low carbon steel as a function of depth and FIG. 4 is an enlarged sectional representation of a multilayer material according to the invention.

FIG. 3 shows the hardness profile as a function of depth of an electron beam-treated low carbon steel. The steel comprised 0.05% carbon and 0.25% manganese. The energy introduced per unit area was 250 watt-seconds per cm$^2$ for a treatment period of approximately 1 second. It is clear from this diagram that a difference in hardness of from 150 to 200 HV 0.01 was achieved between the surface and the bulk material. Several samples were tested, the same curve being obtained for all the samples.

Figure 4:
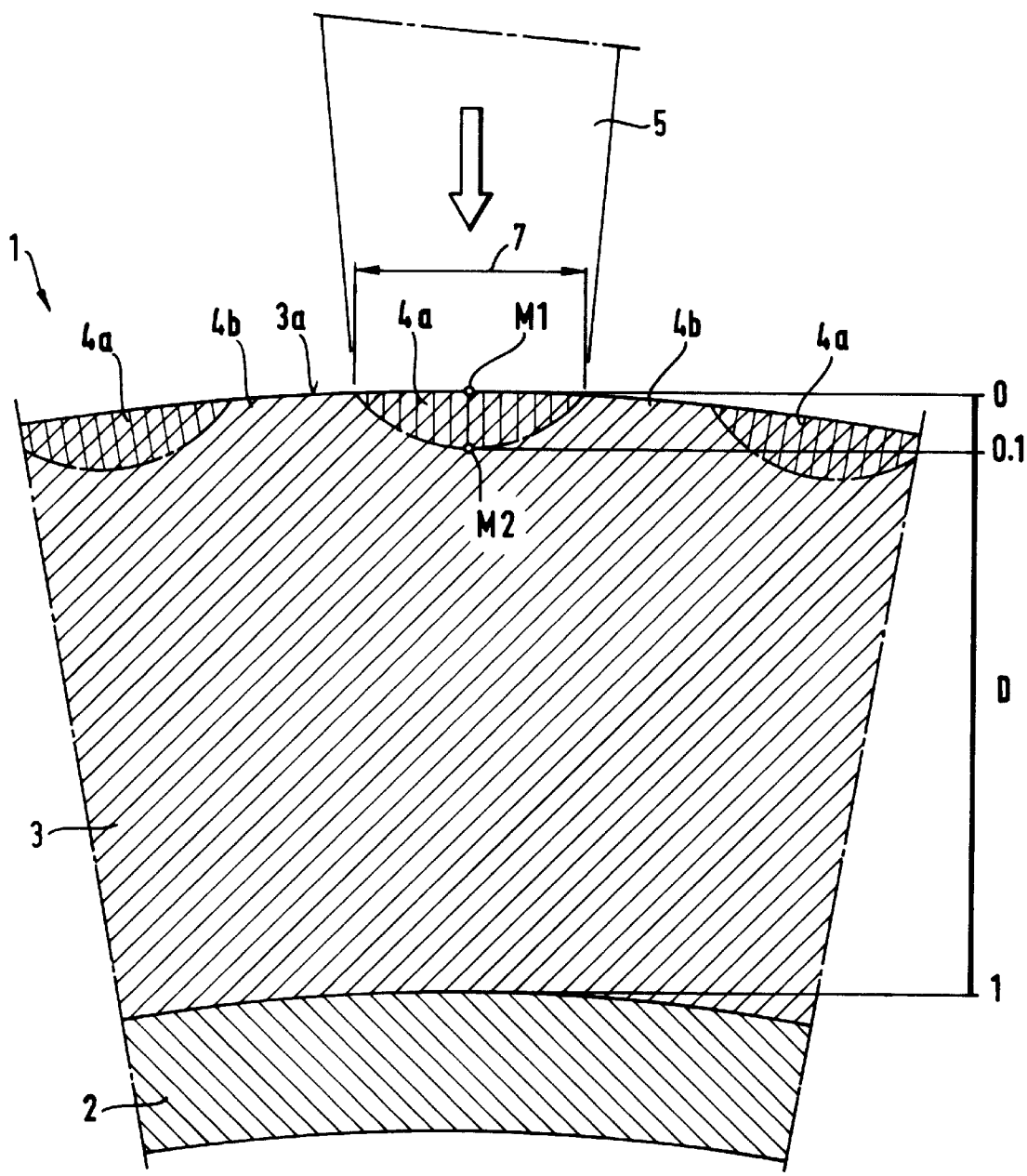

FIG. 4 shows that, at the surface 3a of the backing material 3 which is not connected with the functional layer 2, hardening 4a arises through the concentration of carbon in the treated area 4a resulting from the treatment according to the invention. In the untreated areas 4b of the backing 3, the hardness (carbon content) is substantially unchanged when compared with the situation prior to the action of high-energy beams 5 on the surface areas 4a.

The letter D in FIG. 4 designates the thickness or indeed the depth, when viewed from the direction of the surface 0 not connected with the functional layer and therefore remote therefrom, of the steel substrate layer. To determine the degree of hardening, the Vickers hardness is measured at the surface 0 in the irradiated area 4a, both at the measuring point M1 and at the depth 0.1 D at measuring point M2. M2 is reached from M1 by moving perpendicularly from M1 0.1 D in the direction of the functional layer. The difference M1–M2 corresponds to the degree of hardening.

Obviously, many modifications and variations of the present invention are possible in the light of the above teachings. It is, therefore, to be understood that within the scope of the appended claims, the invention may be practiced otherwise than as specifically described.

What is claimed is:

1. A composite multilayer plain bearing member comprising:
   a backing layer of steel having opposite surfaces;
   a functional layer of bearing metal applied to one of said surfaces of said backing layer; and the other surface of said backing layer being surface hardened to a greater hardness than that of the remainder of said backing layer.

2. The bearing member of claim 1 wherein said backing layer has a predetermined thickness between said opposite surfaces, and said other surface exhibits a hardness of at least 1.5 times that of the hardness of said backing layer measured at a depth of about 0.1 times said predetermined thickness of said backing layer.

3. The bearing member of claim 2 wherein said hardness is measured as Vickers hardness HV 0.01 and said depth is orthoganally determined in the direction of said functional layer.

4. The bearing member of claim 2 wherein said thickness of said backing layer is in the range of about 0.2 to 20 mm.

5. The bearing member of claim 4 wherein said thickness of said backing layer is in the range of about 0.5 to 15 mm.

6. The bearing member of claim 1 wherein said steel of said backing layer comprises unalloyed steel having a carbon content ranging from about 0.03 to 0.06 wt %.

7. The bearing member of claim 1 wherein said steel of said backing layer comprises a low-alloy steel having a carbon content of up to 0.35 wt %, a manganese content of up to 0.8 wt %, a phosphorous content of up to 0.35 wt %, a sulphur content of up to 0.03 wt %, an aluminum content of up to 0.1 wt %, a silicon content of up to 0.12 wt %, a chromium content of up to 1.5 wt % and a nickel content of up to 3 wt %, and with the sum of the alloy elements (apart from carbon) being <5 wt %.

8. A composite multilayer material comprising a substrate layer of steel having a predetermined thickness and at least one functional layer of bearing metal applied to a surface thereof, wherein the substrate has a C content <0.35 wt % and includes a surface remote from said functional layer, and characterized by said substrate exhibiting a hardness greater by a factor of about at least 1.5 times that of the hardness of the substrate at a depth of about 0.1 times said predetermined thickness of said substrate, wherein said hardness is measured as Vickers hardness HV 0.01 and said depth, starting at said remote surface with increased hardness, is determined orthogonally in the direction of said functional layer.

9. A method of fabricating a composite multilayer bearing member comprising:
preparing a backing layer of steel having a predetermined thickness and opposite surfaces;
applying a functional layer of bearing metal to one of the surfaces; and
thereafter locally heat treating the other of the backing layer surfaces to harden the other surface without impairing the integrity of the functional layer.

10. The method of claim 9 wherein the other surface of the backing layer is hardened to at least 1.5 times the hardness of the backing layer at a depth of about 0.1 times the predetermined thickness of the backing layer.

11. The method of claim 9 wherein the backing layer is heat treated by irradiating the other surface with high-energy beams.

12. The method of claim 11 wherein the functional layer is heated to no more than about 80% of the melting temperature of the lowest-melting-point component of the functional layer.

13. A method of heat treating composite multilayer sliding elements, which comprise a substrate layer of unalloyed or low-alloy steel of predetermined thickness and at least one functional layer of bearing metal applied to a surface thereof and including a surface remote from the functional layer, said method including irradiating the remote surface with high-energy beams moved relative to the remote surface in at least selected areas thereof with the radiation penetrating to a depth of at most 1/10 of the thickness of the substrate layer in the respective area and with any increase in temperature of the functional layer caused by the radiation being only at most about 80% of the melting temperature of the lowest-melting-point component of the functional layer.

14. The method of claim 13 wherein the remote surface in the irradiated area of the steel substrate layer is hardened to at least 1.5 times an initial hardness of the substrate.

15. The method of claim 13 wherein the high-energy beam is directed over the remote surface along predetermined paths with the spacing between adjacent paths being smaller than the focus of the beam.

16. The method of claim 13 wherein the high-energy beam is guided over the remote surface at a speed per unit area of 3–5 $cm^2$/sec.

17. The method of claim 13 including guiding the high-energy beam in a gridwise pattern over the surface.

18. The method of claim 13 wherein the remote surface irradiated with the high-energy radiation is cooled by self-quenching.

19. The method of claim 13 including quenching the sliding element after heating by the high energy beam with liquid nitrogen.

20. The method of claim 13 including varying the resultant hardness of select areas of the remote surface such that areas subject to high tribological stress are more intensively hardened than areas subject to lower tribological stress.

21. The method of claim 13 including providing unalloyed steel having a carbon content of from 0.03 to 0.06 wt % as the substrate material.

22. The method of claim 13 including providing a low-alloy steel as the substrate material having the following composition: carbon content up to 0.35 wt %, manganese content up to 0.8 wt %, phosphorous content up to 0.035 wt %, sulphur content up to 0.03 wt %, aluminum content up to 0.1 wt % and silicon content up to 0.12 wt %, chromium content up to 1.5 wt % and nickel content up to at most 3 wt %; and with the sum of alloy elements (apart from carbon) being <5 wt %.

23. A composite multilayer material comprising a substrate layer of steel and at least one functional layer of bearing metal applied, thereto, wherein the substrate is an unalloyed or low-alloy steel with a C content <0.35% (wt/wt) and comprises a surface remote from the functional layer(s), wherein at least in parts of the remote surface, the steel substrate exhibits a hardness greater by the factor 1.5 or more than at a depth corresponding to approximately 0.1 times the thickness of the steel substrate, wherein the hardness is measured as Vickers hardness HV 0.01 and the depth or thickness, starting at the remote surface with increased hardness, is determined orthogonally in the direction of the functional layer(s).

24. A composite multilayer material according to claim 23, wherein the thickness of the steel substrate layer ranges from approximately 0.2 to 20 mm.

25. A composite multilayer material according to claim 23, wherein the thickness of the steel substrate layer ranges from approximately 0.5 to 15 mm.

26. A composite multilayer material according to claim 23, wherein the substrate layer is of unalloyed steel, which has a C content ranging from 0.03 to 0.06% (wt/wt).

27. A composite multilayer material according to claim 23, wherein the substrate layer is of low-alloy steel, which comprises a carbon content of up to 0.35%, a manganese content of up to 0.8%, a phosphorous content of up to 0.035%, a sulfur content of up to 0.03%, an aluminum content of up to 0.1%, a silicon content of up to 0.12%, a chromium content of up to 1.5% and a nickel content of up to 3%, the sum of the alloy elements (apart from carbon) being <5% and all percentages being percentages by weight (wt/wt).

28. A method of improving the surface hardness of composite multilayer materials which comprise a substrate layer of unalloyed or low-alloy steel and at least one functional layer of bearing metal applied thereto, the substrate layer comprising a surface remote from the functional layers, wherein the remote surface is irradiated at least in selected areas with high-energy beams which are moved relative to the surface to be irradiated, the radiation being such that it penetrates to a depth of at most 1/10 of the thickness of the substrate layer in the respective area and in that the increase in the temperature of the functional layer caused by the radiation reaches at most approximately 80% of the melting temperatures of the lowest-melting-point component of this functional layer.

29. A method according to claim 28, wherein the energy per unit area and the residence time of the high-energy radiation are such that the remote surface in the irradiated area of the steel substrate layer is hardened to at least 1.5 times the initial hardness.

30. A method according to claim 28, wherein the high-energy beam is conveyed over the surface to be treated along predetermined paths, the spacing of the paths being smaller than the focus of the beam.

31. A method according to claim 28, wherein the high-energy beam is guided over the surface to be treated at a speed per unit area of 3–5 $cm^2$/sec.

32. A method according to claim 28, wherein the high-energy beam is guided gridwise over the surface to be treated.

33. A method according to claim 28, wherein the surface irradiated with high-energy radiation is cooled by the self-quenching effect.

34. A method according to claim 28, wherein the composite material is quenched after irradiation by means of liquid nitrogen.

35. A method according to claim 28, wherein modification is controlled by varying the energy input and/or the feed of the high-energy radiation to the surface to be treated, in such a way that, during an irradiation process, areas subject to higher tribological Stress are more intensively hardened than areas subject to lower tribological stress.

36. A method according to claims 28, wherein the heat treatment is carried out on unalloyed steel with a carbon content of from 0.03 to 0.06 wt %.

37. A method according to claim 28, wherein the steel substrate is a low-alloy steel of the following composition:

carbon content up to 0.35 wt %, manganese content up to 0.8 wt %, phosphorous content up to 0.035 wt %, sulfur content up to 0.03 wt %, aluminum content up to 0.1 wt % and silicon content up to 0.12 wt %, chromium content up to 1.5 wt % and nickel content up to at most 3 wt %, and with the sum of the alloy elements (apart from carbon) being <5 wt %.

* * * * *